United States Patent [19]

Nagai et al.

[11] Patent Number: 5,676,016
[45] Date of Patent: Oct. 14, 1997

[54] ELECTRIC ACTUATOR

[75] Inventors: Shigekazu Nagai; Akio Saitoh; Tadasu Kawamoto; Masahisa Hasegawa; Toru Sugiyama, all of Ibaraki-ken, Japan

[73] Assignee: SMC Kabushiki Kaisha, Tokyo, Japan

[21] Appl. No.: 598,652

[22] Filed: Feb. 8, 1996

[30] Foreign Application Priority Data

Feb. 10, 1995 [JP] Japan .................. 7-022566

[51] Int. Cl.$^6$ .................. F16H 25/20
[52] U.S. Cl. .................. 74/89.15; 74/424.8 R; 108/20; 108/143
[58] Field of Search .................. 74/424.8 R, 459, 74/89.15; 108/20, 143

[56] References Cited

U.S. PATENT DOCUMENTS

| | | | |
|---|---|---|---|
| 2,688,951 | 9/1954 | Sears | 74/89.15 X |
| 3,727,472 | 4/1973 | Maekawa | 74/89.15 |
| 4,201,935 | 5/1980 | Fukuma et al. | 318/15 |
| 4,288,182 | 9/1981 | Vandenkieboom et al. | 408/129 |
| 4,371,360 | 2/1983 | Ojima et al. | 74/89.15 X |
| 4,403,389 | 9/1983 | Coope | 248/657 X |
| 5,542,744 | 8/1996 | Bathrick | 74/89.15 X |

FOREIGN PATENT DOCUMENTS

| | | |
|---|---|---|
| 29 19 233 | 11/1980 | Germany . |
| 34 13 184 | 10/1985 | Germany . |
| 89 09 120.5 | 10/1989 | Germany . |
| 2 021 013 | 11/1979 | United Kingdom . |

*Primary Examiner*—Allan D. Herrmann
*Attorney, Agent, or Firm*—Oblon, Spivak, McClelland, Maier & Neustadt, P.C.

[57] ABSTRACT

An electric actuator has a body with a hole defined therein and an electric motor fixed to an end of the body. The electric motor has a rotatable shaft to which a feed screw is coaxially connected, and a feed nut is threaded over the feed screw. The hole receives an elongate cylindrical tubular member slidably fitted therein which surrounds the feed screw. The feed nut is secured to an end of the tubular member, and a support for feeding a workpiece supported thereon is fixed to the other end of the tubular member. The feed screw, which serves as a drive force transmitting shaft, is protected by the surrounding tubular member from the deposition thereon of dust, dirt, or other foreign matter and hence from unwanted shutdown or breakage.

12 Claims, 14 Drawing Sheets

ELECTRIC ACTUATOR

BACKGROUND OF THE INVENTION

1. Field of the Invention

The present invention relates to an electric actuator for displacing a support to feed a workpiece with linear motion which is converted from rotational drive forces of an electric motor by a drive force transmitting means mounted in an actuator body.

2. Description of the Related Art

Electric actuators have heretofore been used as means for conveying workpieces. A conventional electric actuator basically comprises an electric motor disposed in an actuator body and a feed screw serving as a drive force transmitting shaft coupled to a rotatable shaft of the electric motor. The feed screw and the rotatable shaft are coaxially coupled to each other by a coupling. A feed nut is threaded over the feed screw, the feed nut having an end fixed to a support that is positioned outside of the actuator body for feeding a workpiece. When the electric motor is energized, the feed screw is rotated by the rotatable shaft thereof through the coupling, moving the feed nut in an axial direction of the feed screw thereby to linearly displace the support that is fixed to the feed nut.

Another conventional electric actuator comprises an electric motor disposed in an actuator body and having a hollow cylindrical rotor with an internally threaded inner wall threaded by a feed screw serving as a drive force transmitting shaft. The feed screw extends through a hole defined in the actuator body and is fixed to a support that is positioned outside of the actuator body for feeding a workpiece. When the electric motor is energized, the cylindrical rotor is rotated to move the feed screw axially into or out of the hole defined in the actuator body for thereby linearly displacing the support.

SUMMARY OF THE INVENTION

It is a general object of the present invention to provide an electric actuator which has a drive force transmitting shaft disposed in a hole defined in an actuator body and surrounded by a tubular member having an end fixed to a support, so that the drive force transmitting shaft can be protected from the deposition thereon of dust, dirt, or other foreign matter and hence from unwanted shutdown or breakage.

A major object of the present invention is to provide an electric actuator which has a feed screw serving as a drive force transmitting shaft and a feed nut threaded over the feed screw and fixed to a tubular member surrounding the feed screw, so that the feed screw can be protected from the deposition thereon of dust, dirt, or other foreign matter and hence from unwanted shutdown or breakage.

Another object of the present invention is to provide an electric actuator which has a support for feeding a workpiece, the support having guide members extending parallel to a feed screw which serves as a drive force transmitting shaft, so that the support is prevented from rotating upon energization of an electric motor of the electric actuator.

Still another object of the present invention is to provide an electric actuator which has an electric motor including a hollow cylindrical rotor, a feed screw serving as a drive force transmitting shaft coupled to the electric motor, and a feed nut threaded over the feed screw and fixed coaxially to the hollow cylindrical rotor, so that the electric actuator is relatively small in size.

Yet still another object of the present invention is to provide an electric actuator which an electric motor including a hollow cylindrical rotor with an internally threaded inner wall, a support for feeding a workpiece, and a feed screw serving as a drive force transmitting shaft fixed to the support and threaded in the internally threaded inner wall of the hollow cylindrical rotor, so that the electric actuator is made up of a relatively small number of parts and is relatively small in size.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
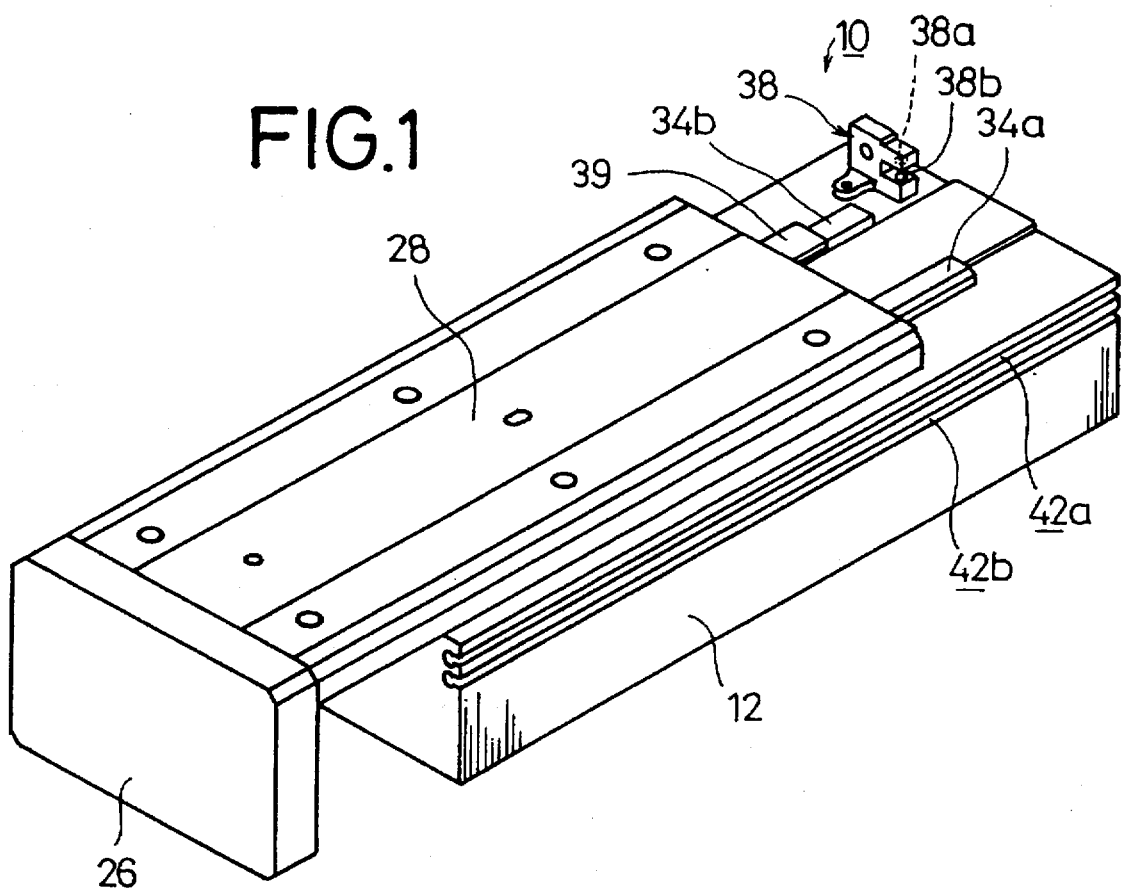
FIG. 1 is a perspective view of an electric actuator according to a first embodiment of the present invention.
Figure 2:
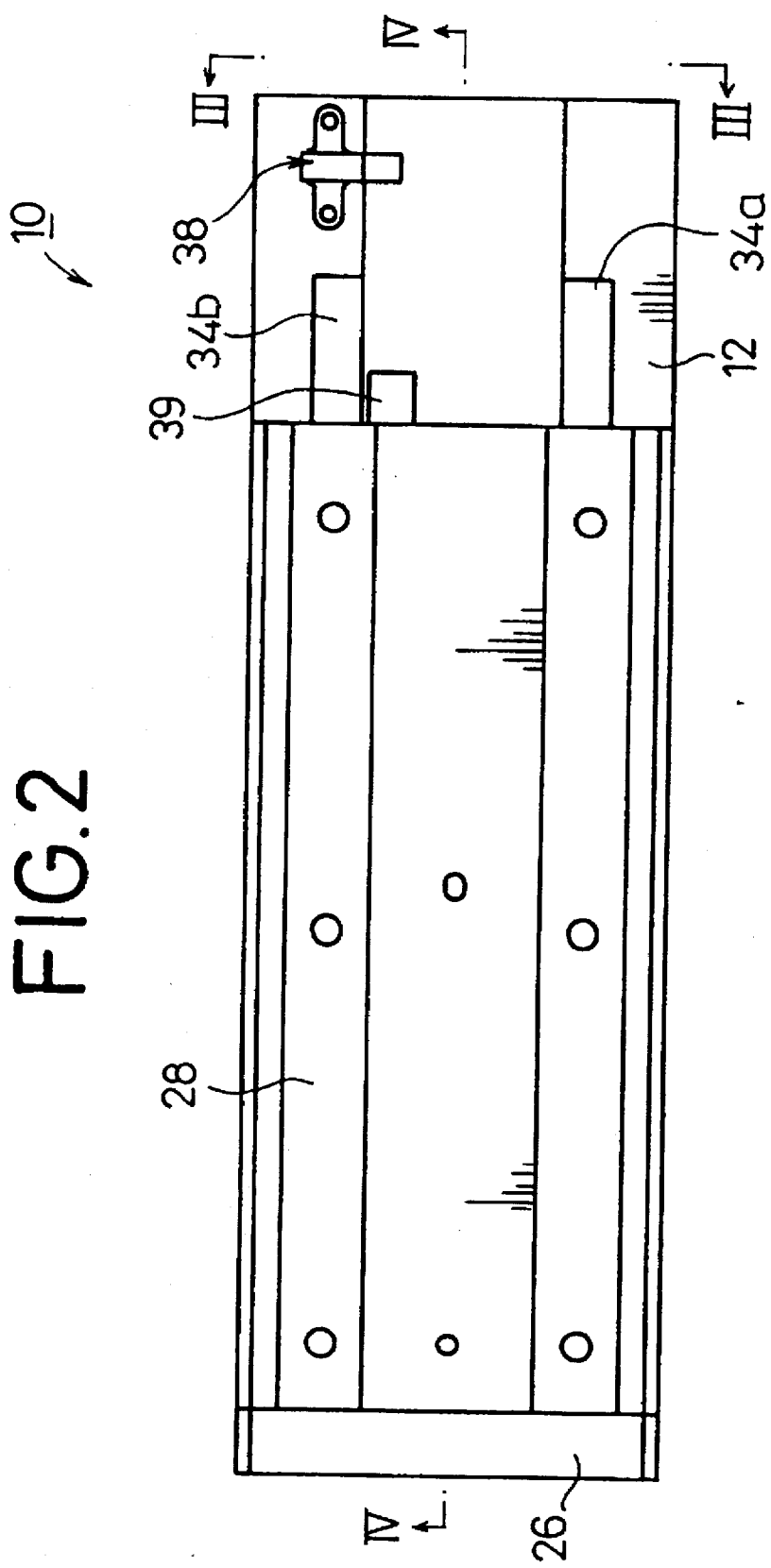
FIG. 2 is a plan view of the electric actuator shown in FIG. 1.

Identical parts are denoted by identical reference numerals throughout views.

As shown in FIG. 1, an electric actuator, generally designated by the reference numeral 10, according to a first embodiment of the present invention has an elongate body 12 with a hole 14 (see FIG. 4) defined longitudinally in the body 12.

Figure 4:
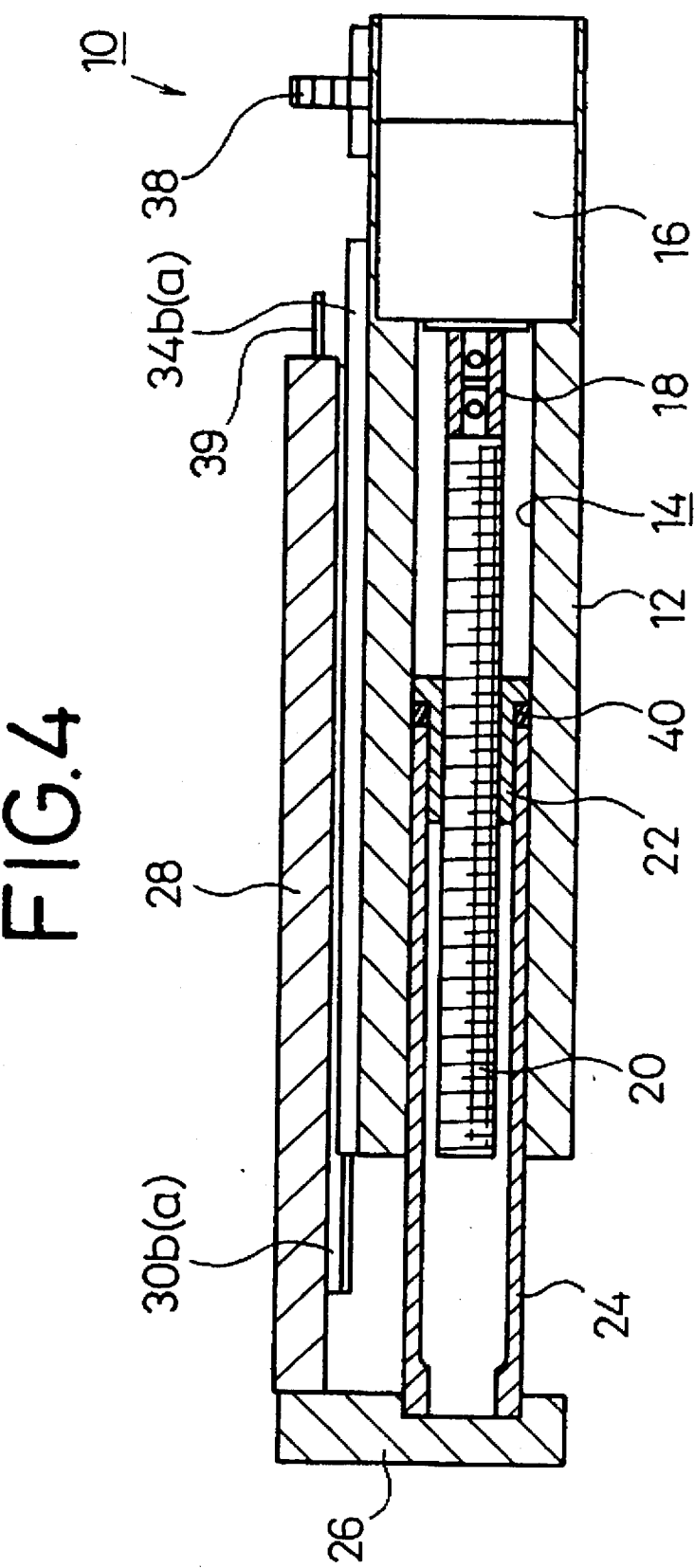
FIG. 4 is a cross-sectional view taken along line IV—IV of FIG. 2.

As shown in FIG. 4, the electric actuator 10 includes an electric motor 16 fixedly mounted on an end of the body 12 and having a rotatable shaft to which a feed screw 20 is coaxially coupled by a coupling 18. The feed screw 20, which serves as a drive force transmitting shaft, is disposed in and extends longitudinally in the hole 14. A feed nut 22 is threaded over the feed screw 20 in the hole 14 and surrounded by an elongate cylindrical tubular member 24 which is slidably fitted in the hole 14. The tubular member 24 is made of a light metal such as aluminum or a synthetic resin. The feed nut 22 is fixed to an end of the tubular member 24 within the hole 14, and a plate-like support 26 is fixed to an opposite end of the tubular member 24 that is positioned outside of the hole 14.

Figure 3:
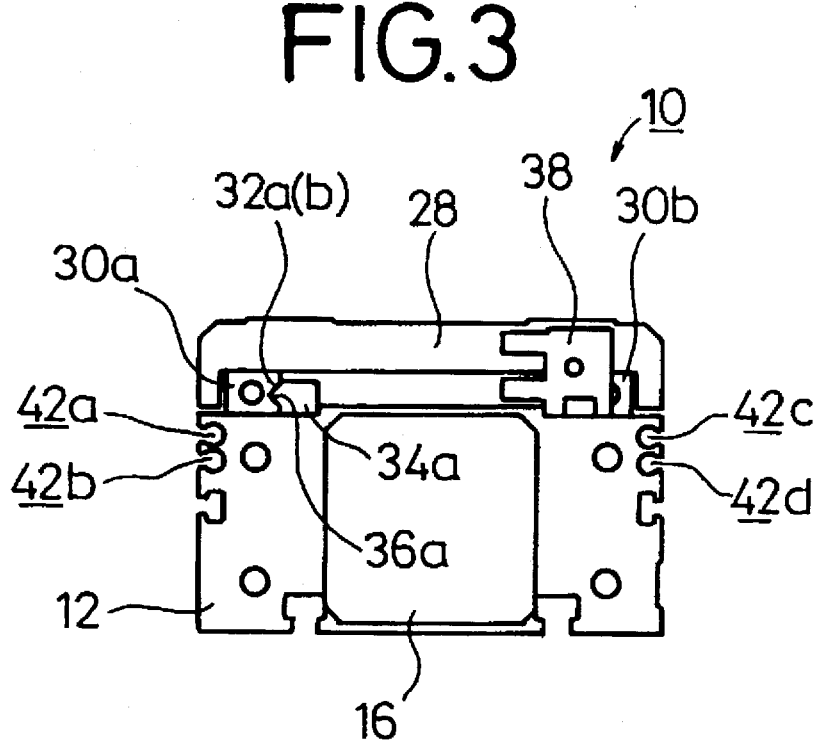
FIG. 3 is a side elevational view of the electric actuator taken along line III—III of FIG. 2.

As shown in FIGS. 1 through 4, the electric actuator 10 also includes a slide table 28 connected at an end thereof to the support 26. As shown in FIG. 3, a pair of laterally spaced guide members 30a, 30b is secured to a lower surface of the slide table 28, the guide members 30a, 30b extending in the longitudinal direction of the slide table 28. The guide members 30a, 30b have respective V-shaped grooves 32a, 32b defined in respective inner side surfaces thereof. A pair of guide rails 34a, 34b is mounted on an upper surface of the body 12 at positions confronting the guide members 30a, 30b. The guide rails 34a, 34b have respective ridges 36a, 36b on their outer side surfaces, which slidably engage in the respective grooves 32a, 32b of the guide members 30a, 30b. The guide members 30a, 30b and the guide rails 34a, 34b jointly serve as a guide means for guiding the slide table 28 with respect to the body 12 (see FIG. 3).

Figure 5:
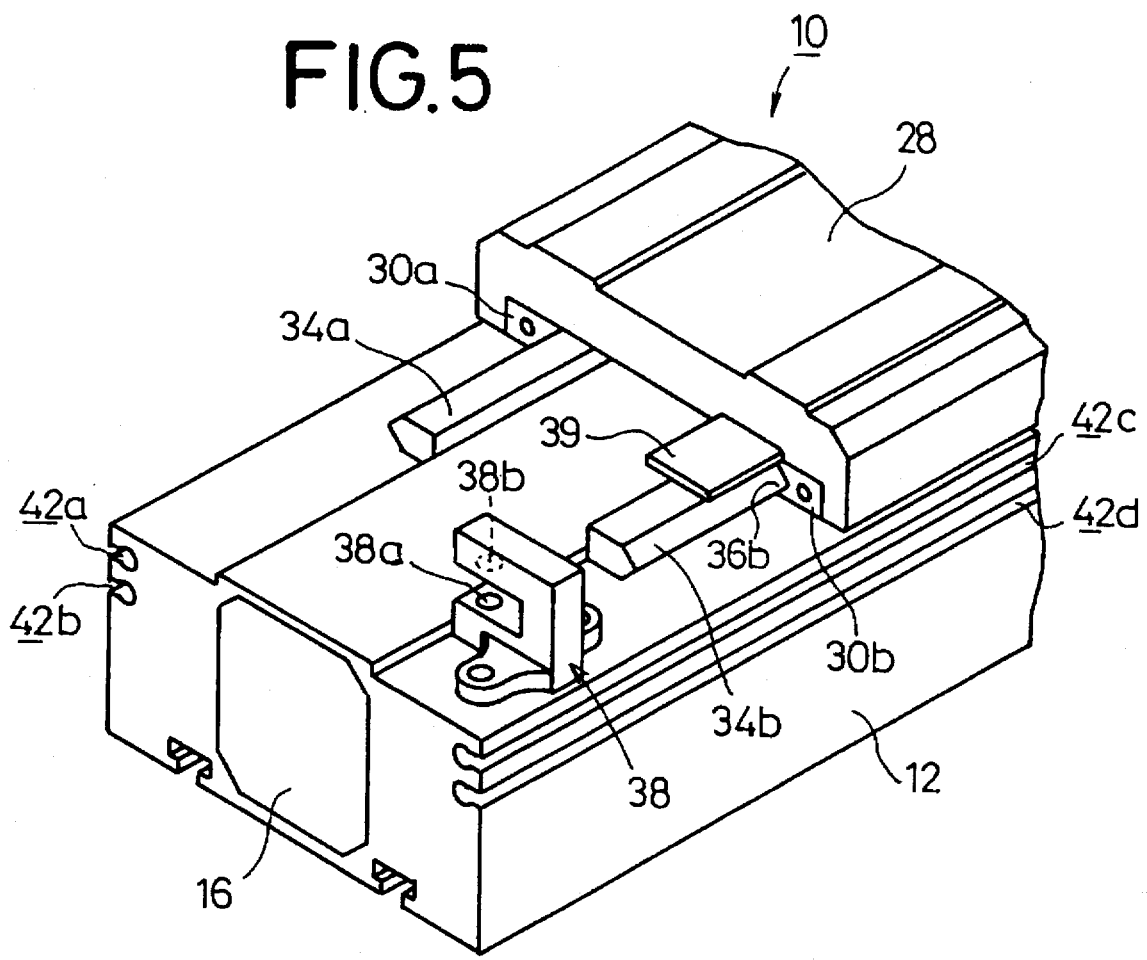
FIG. 5 is an enlarged fragmentary perspective view of the electric actuator shown in FIG. 1.

A sensor switch 38 is mounted on the upper surface of the body 12 at an end thereof remote from the support 26. As shown in FIG. 5, the sensor switch 38 comprises a light-emitting element 38a and a light-detecting element 38b which are positioned in vertically confronting relationship to each other. The slide table 28 has a shield plate 39 projecting from its end remote from the support 26. The shield plate 39 is positioned such that when the slide table 28 slides in a direction away from the support 26, the shield plate 39 moves into a space defined between the light-emitting element 38a and the light-detecting element 38b. When the shield plate 39 is not positioned in the space defined between the light-emitting element 38a and the light-detecting element 38b, light emitted from the light-emitting element 38a is detected by the light-detecting element 38b, turning on the sensor switch 38. When the shield plate 39 is positioned in the space defined between the light-emitting element 38a and the light-detecting element 38b, light emitted from the light-emitting element 38a is blocked by the light-detecting element 38b, turning off the sensor switch 38.

As shown in FIG. 4, a position-detecting magnet 40 is mounted on the feed nut 22. As shown in FIGS. 3 and 5, the body 12 has a pair of grooves 42a, 42b defined in a side surface thereof and a pair of grooves 42c, 42d defined in an opposite side surface thereof, and magnetic switches (not shown) are mounted in the respective grooves 42a–42d at given positions for detecting magnetic fluxes from the position-detecting magnet 40.

The electric actuator 10 of the above structure operates as follows:

When the electric motor 16 is energized by a power supply (not shown), the feed screw 20 is rotated about its own axis by the electric motor 16 through the coupling 18. The threaded engagement between the feed screw 20 and the feed nut 22 converts the rotation of the feed screw 20 into linear motion, thereby linearly displacing the feed nut 22 in the axial direction of the feed screw 20. As a result, the slide table 28 moves along the guide rails 34a, 34b in response to the energization of the electric motor 16, for thereby feeding a workpiece supported on the slide table 28. The open end of the hole 14 is closed by the tubular member 24, and the feed screw 20 is surrounded by the tubular member 24. Therefore, the feed screw 20 is not exposed to the exterior, and is protected from the deposition thereon of dust, dirt, or other foreign matter.

When the slide table 28 is moved by the electric motor 16, displacing the shield plate 39 into the space between the light-emitting element 38a and the light-detecting element 38b of the sensor switch 38, the sensor switch 38 is turned off, sending a turn-off signal to a control system (not shown). The control system now detects the arrival of the slide table 28 at an end of its stroke. Since the slide table 28 cannot be moved further, if the electric motor 16 were continuously energized, then the electric motor 16, the feed screw 20, and the feed nut 22 would be unduly overloaded, and would possibly be damaged. According to the present invention, when the sensor switch 38 is turned off, the control system turns off the electric motor 16, stopping the feed screw 20 and the feed nut 22. Therefore, the electric motor 16, the feed screw 20, and the feed nut 22 are protected from being damaged. When the position-detecting magnet 40 on the feed nut 22 approaches the non-illustrated magnetic switches in the grooves 42a–42d, the magnetic switches detect magnetic fluxes from the position-detecting magnet 40, and the control system which is connected to the magnetic switches detects the position of the feed nut 22. Therefore, the control system can detect the position of the slide table 28 while it is feeding the workpiece supported thereon.

While the slide table 28 is connected to the support 26 in this embodiment, the slide table 28 and the support 26 may be of an integral unitary structure.

In the first embodiment, since the open end of the hole 14 is closed by the tubular member 24, and the feed screw 20 is surrounded by the tubular member 24, the feed screw 20 is protected from the deposition thereon of dust, dirt, or other foreign matter. Accordingly, the electric actuator 10 is prevented from being subject to unwanted shutdown or damage which would otherwise result from dust, dirt, or other foreign matter caught between the feed screw 20 and the feed nut 22. The electric actuator 10 can thus operate stably to feed the workpiece on the slide table 28, and its maintenance is facilitated.

An electric actuator according to a second embodiment of the present invention will be described below with reference to FIGS. 6 through 9. According to the second embodiment, the electric actuator, generally designated by the reference numeral 44, has a slide table which is of a configuration different from that of the slide table 28 of the electric actuator 10 according to the first embodiment. Details of only those parts of the electric actuator 44 which differ from those of the electric actuator 10 according to the first embodiment will be described below. Those parts of the electric actuator 44 which are identical to those of the electric actuator 10 according to the first embodiment are denoted by identical reference numerals, and will not be described in detail below.

Figure 6:
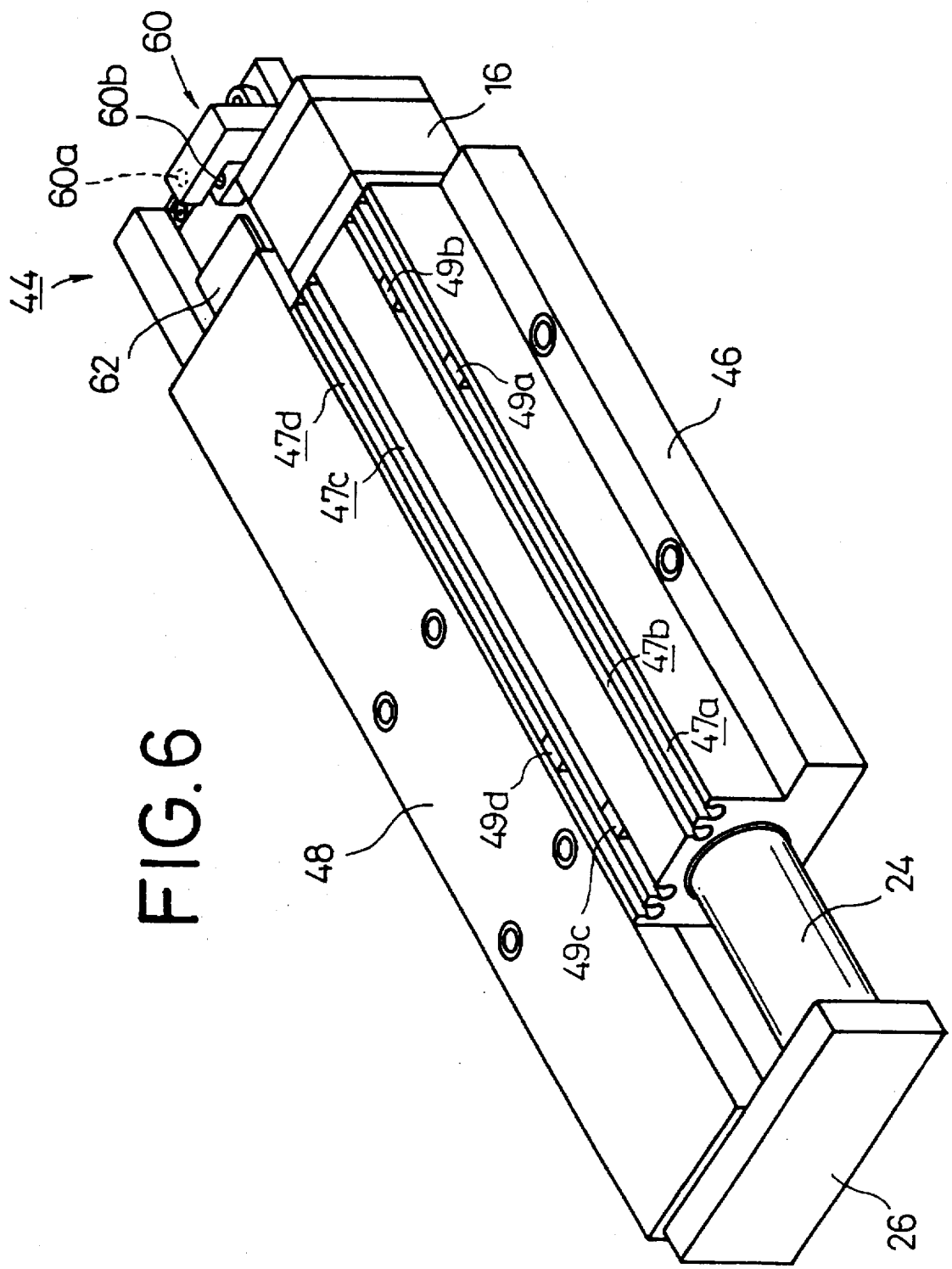
FIG. 6 is a perspective view of an electric actuator according to a second embodiment of the present invention.

As shown in FIG. 6, the electric actuator 44 has a wide elongate body 46 including a longitudinal block projecting upwardly, and a slide table 48 slidably mounted on the body 46 and extending parallel thereto. The longitudinal block of the body 46 has a pair of parallel grooves 47a, 47b defined in an upper surface thereof along one of its longitudinal edges and a pair of parallel grooves 47c, 47d defined in the upper surface thereof along the other longitudinal edge. Magnetic sensors 49a, 49b, 49c, 49d are mounted respectively in the grooves 47a, 47b, 47d, 47d and spaced from each other longitudinally of the body 46.

Figure 7:
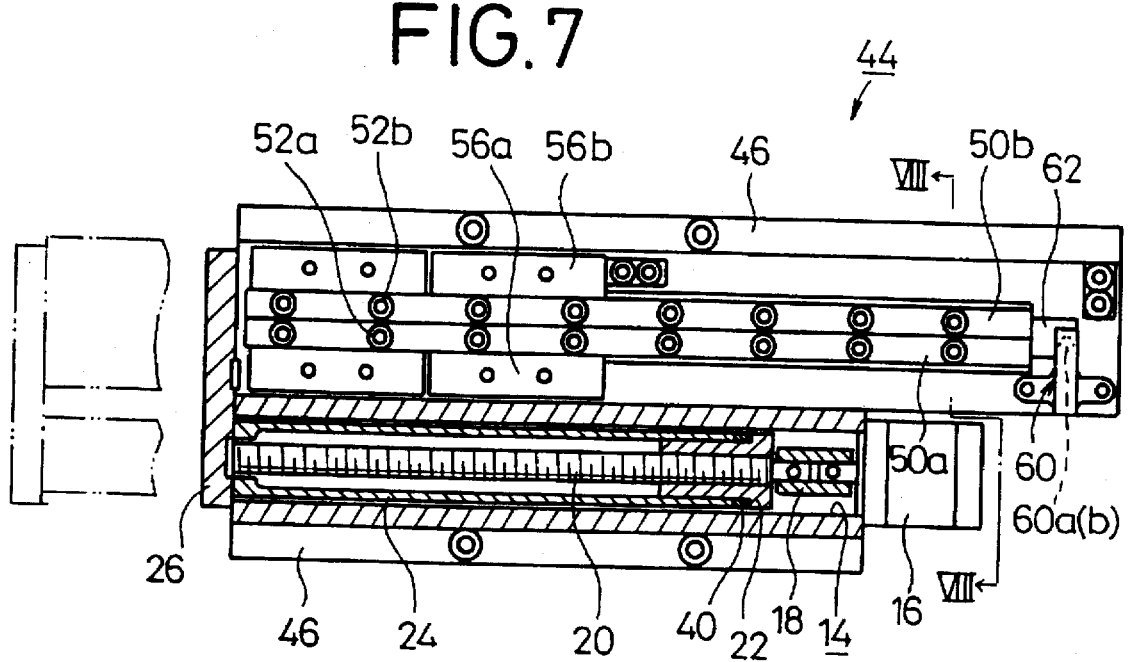
FIG. 7 is a longitudinal cross-sectional view of the electric actuator shown in FIG. 6.
Figure 8:
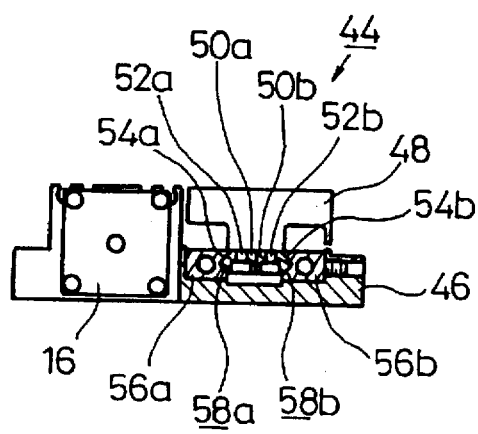
FIG. 8 is a cross-sectional view taken along line VIII—VIII of FIG. 7.

As shown in FIG. 7, two guide members 50a, 50b are fastened to a lower surface of the slide table 48 by respective sets of screws 52a, 52b in the longitudinal direction of the slide table 48. As shown in FIG. 8, the guide members 50a, 50b have respective ridges 54a, 54b on their outer side surfaces. The body 46 has two laterally spaced guide rails 56a, 56b fixed to an upper surface thereof and having respective V-shaped grooves 58a, 58b defined respectively in inner side surfaces thereof. The ridges 54a, 54b of the guide members 50a, 50b are slidably fitted in the grooves 58a, 58b. The guide members 50a, 50b and the guide rails 56a, 56b jointly serve as a guide means for guiding the slide table 48 to move with respect to the body 46.

Figure 9:
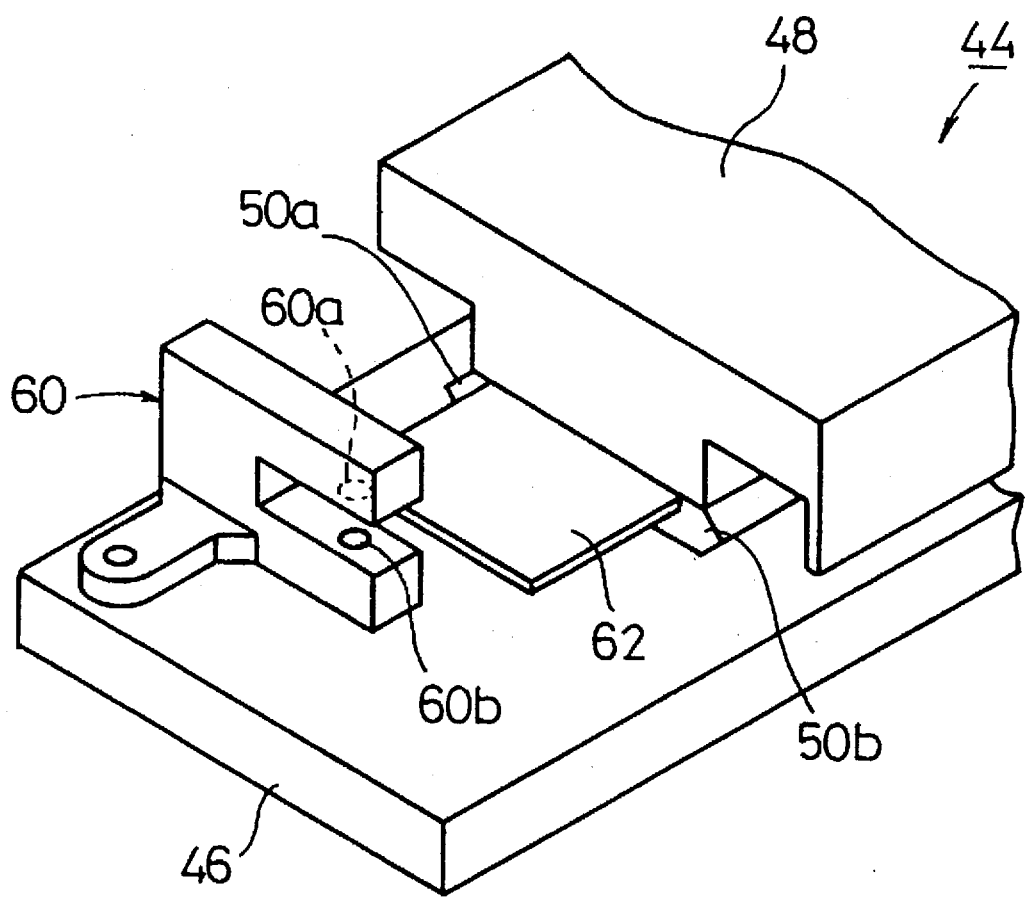
FIG. 9 is an enlarged fragmentary perspective view of the electric actuator shown in FIG. 6.

As shown in FIG. 9, a sensor switch 60 is mounted on the upper surface of the body 46 at an end thereof remote from the support 26. The sensor switch 60 comprises a light-emitting element 60a and a light-detecting element 60b which are positioned in vertically confronting relationship to each other. The slide table 48 has a shield plate 62 projecting from its end remote from the support 26. The shield plate 62 is positioned such that when the slide table 48 slides in a direction away from the support 26, the shield plate 60 moves into a space defined between the light-emitting element 60a and the light-detecting element 60b.

Operation of the electric actuator 44 of the above structure will be described below.

When the electric motor 16 is energized by a power supply (not shown), the slide table 48 is linearly displaced. As a consequence, in response to the energization of the electric motor 16, the slide table 48 moves along the guide rails 56a, 56b. The position of the slide table 48 can be detected when the magnet 40 moves closely to magnetic sensors 49a–49d mounted in the respective grooves 47a–47d.

In the second embodiment, the open end of the hole 14 is closed by the tubular member 24, and the feed screw 20 is surrounded by the tubular member 24. Therefore, the feed screw 20 is not exposed to the exterior, and is protected from the deposition thereon of dust, dirt, or other foreign matter.

Figure 10:
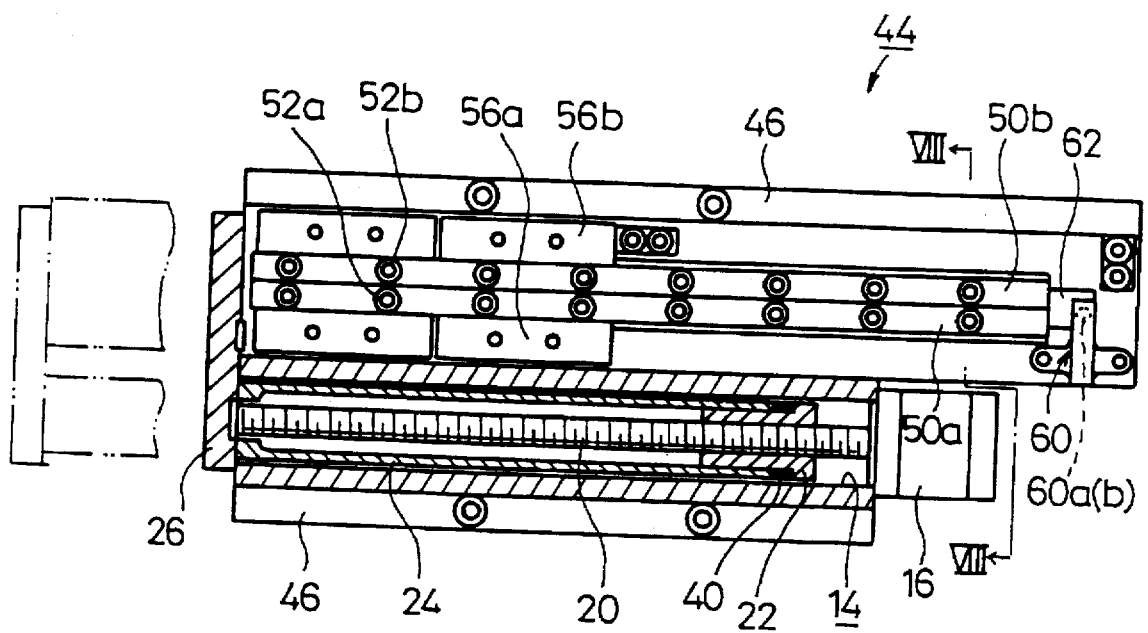
FIG. 10 is a longitudinal cross-sectional view of a modification of the electric actuator according to the second embodiment of the present invention.

While the rotatable shaft of the electric motor 16 is coupled to the feed screw 20 by the coupling 18 in the second embodiment, the rotatable shaft of the electric motor 16 and the feed screw 20 may be integrally formed with each other as shown in FIG. 10. Such a modified structure allows the electric actuator to be made up of a reduced number of parts and manufactured at a reduced cost.

Figure 11:
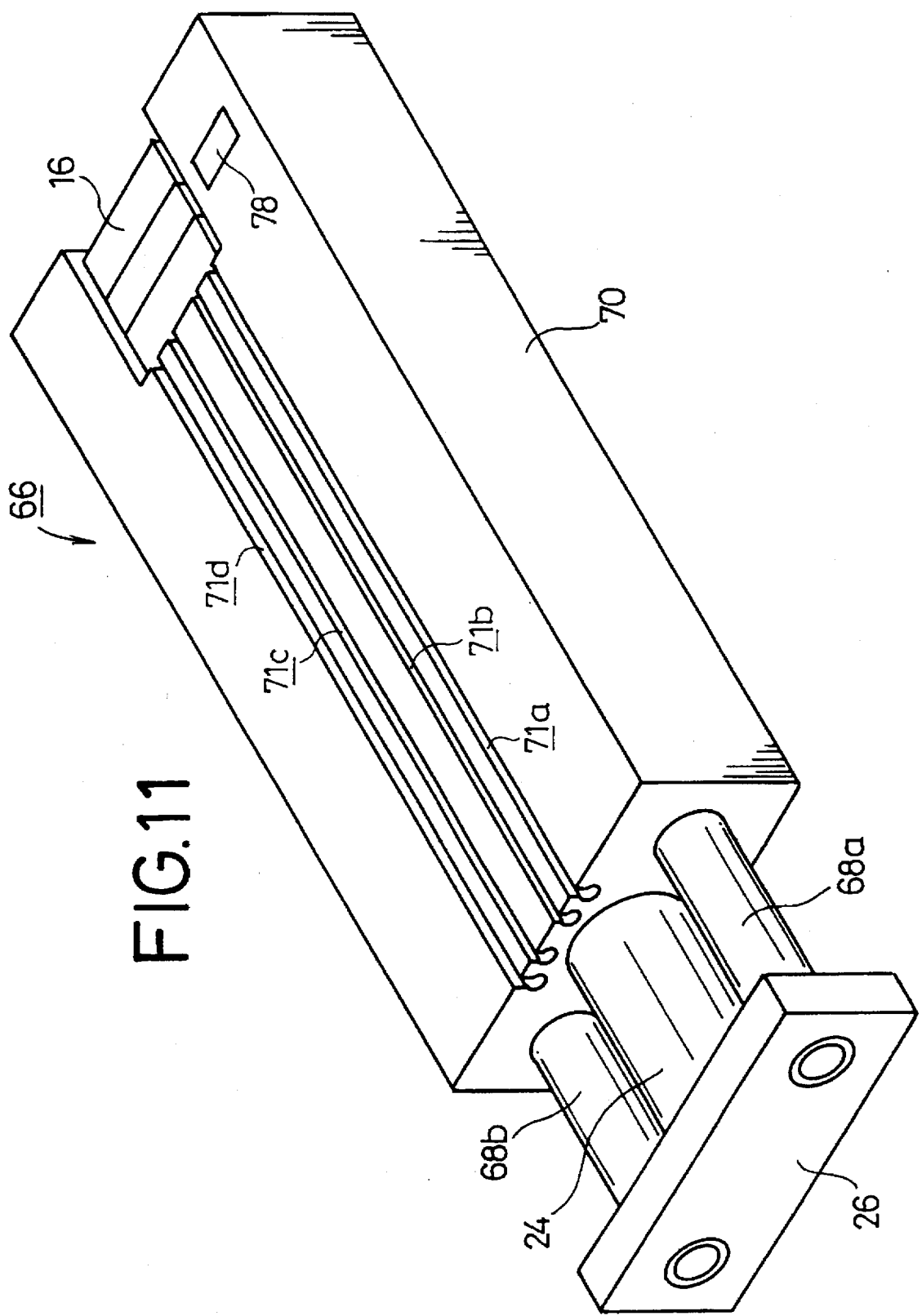
FIG. 11 is a perspective view of an electric actuator according to a third embodiment of the present invention.
Figure 12:
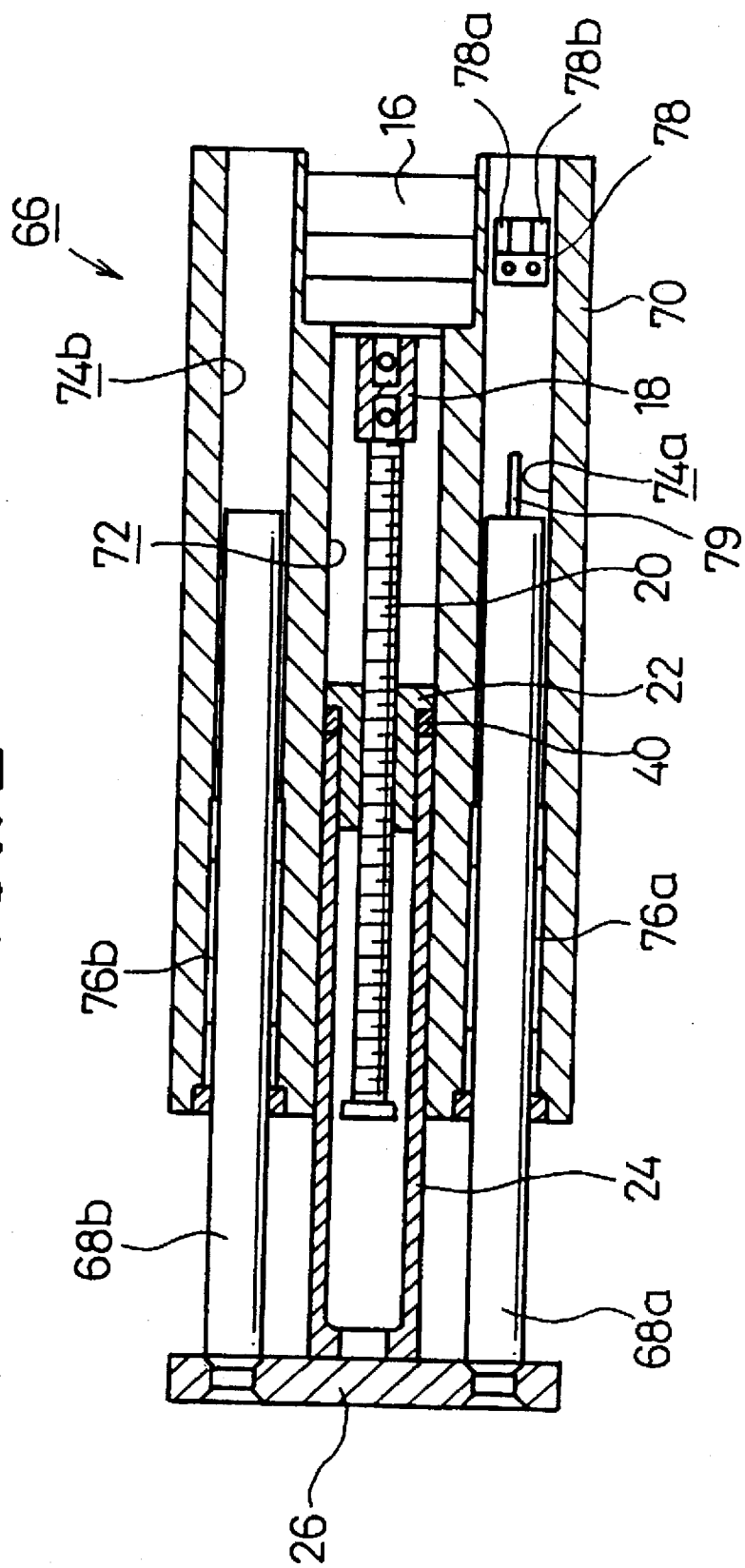
FIG. 12 is a longitudinal cross-sectional view of the electric actuator shown in FIG. 11.

FIGS. 11 and 12 show an electric actuator according to a third embodiment of the present invention. The electric actuator, generally designated by the reference numeral 66, according to the third embodiment of the present invention does not have a slide table similar to the slide table 28 of the electric actuator 10 according to the first embodiment, and has two rods 68a, 68b serving as a guide means, rather than the guide members 30a, 30b and the guide rails 34a, 34b of the electric actuator 10 according to the first embodiment. Details of only those parts of the electric actuator 66 which differ from those of the electric actuator 10 according to the first embodiment will be described below.

As shown in FIG. 11, the electric actuator 66 has an elongate body 70 with four grooves 71a–71d defined in an upper surface thereof. Magnetic sensors (not shown) are mounted in the respective grooves 71a–71d. As shown in FIG. 12, the body 70 has a first hole 72 and a pair of laterally spaced second holes 74a, 74b which are defined longitudinally therein. The first hole 72, which is positioned between the second holes 74a, 74b, houses an electric motor 16, a coupling 18, a feed screw 20, a feed nut 22, and a tubular member 24 in the same manner as with the electric actuator 10 according to the first embodiment. Bushings 76a, 76b are mounted in respective end portions of the second holes 74a, 74b, and the rods 68a, 68b are slidably inserted in the respective bushings 76a, 76b. The support 26 is fixed to the tubular member 24 and the rods 68a, 68b. The rods 68a, 68b and the second holes 74a, 74b jointly serve as a guide means for guiding the support 26 to move with respect to the body 70. A sensor switch 78 is disposed in an end of the second hole 74a remote from the support 26. The sensor switch 78 comprises a light-emitting element 78a and a light-detecting element 78b which confront each other. A shield plate 79 is mounted on an end of the rod 68a remote from the support 26. The shield plate 79 is positioned such that when the rod 68a moves toward the end of the second hole 74a remote from the support 26, the shield plate 79 moves into a space defined between the light-emitting element 78a and the light-detecting element 78b.

When the electric motor 16 is energized by a power supply (not shown), the feed nut 22 is linearly displaced to cause the tubular member 24 to move the support 26 in the longitudinal direction of the electric actuator 66.

In the third embodiment, the open end of the first hole 72 is closed by the tubular member 24, and the feed screw 20 is surrounded by the tubular member 24 and not exposed to the exterior. Therefore, the feed screw 20 is protected from the deposition thereon of dust, dirt, or other foreign matter.

Figure 13:
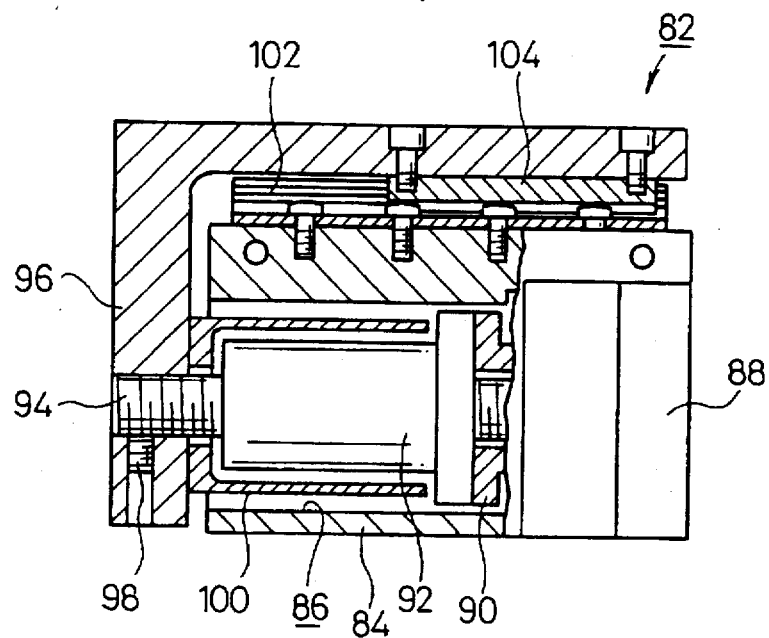
FIG. 13 is a partial longitudinal cross-sectional view of an electric actuator according to a fourth embodiment of the present invention.

An electric actuator according to a fourth embodiment of the present invention will be described below with reference to FIG. 13. As shown in FIG. 13, the electric actuator, generally designated by the reference numeral 82, comprises an elongate body 84 having a hole 86 defined longitudinally therein and an electric motor 88 mounted in an end of the hole 86. The electric motor 88 has a hollow cylindrical rotor 90 with a feed nut 92 coaxially fixed thereto. The feed nut 92 is threaded over a feed screw 94 which has an end fastened by a screw 98 to a slide table 96 that is integral with a support for feeding a workpiece supported thereon. An elongate cylindrical tubular member 100 is fixed to the slide table 96 and disposed slidably in the hole 86 in surrounding relationship to the feed screw 94. A guide rail 102 is mounted on an upper surface of the body 84 and extends in the longitudinal direction of the body 84. The guide rail 102 is held in slidable engagement with a guide member 104 which is mounted on a lower surface of the support of the slide table 96. The guide rail 102 and the guide member 104 jointly serve as a guide means for guiding the slide table 96 to move with respect to the body 84.

The electric actuator 82 operates as follows: When the electric motor 88 is energized by a power supply (not shown), the rotor 90 is rotated about its own axis. Because of the threaded engagement between the feed nut 92 and the feed screw 94, the rotation of the rotor 90 is converted into linear motion, thereby linearly displacing the feed screw 94 in its axial direction. As a result, the slide table 96 moves in the longitudinal direction of the electric actuator 82 in response to the energization of the electric motor 88.

Inasmuch as the feed screw 94 is surrounded by the tubular member 100, the feed screw 94 is not exposed to the exterior, and is protected from the deposition thereon of dust, dirt, or other foreign matter. Since the feed screw 94 axially moves within the hollow rotor 90 upon energization of the electric motor 88, the length of the electric actuator 82 may be relatively small while the slide table 96 may be movable in a relatively large range.

Figure 14:
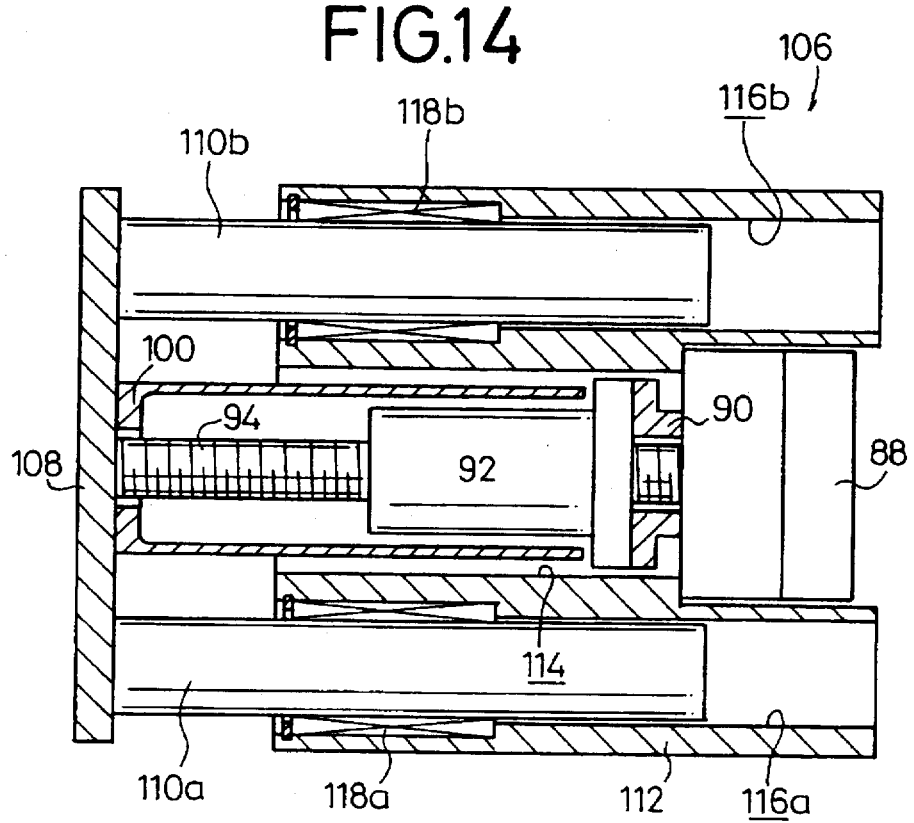
FIG. 14 is a longitudinal cross-sectional view of an electric actuator according to a fifth embodiment of the present invention.

FIG. 14 illustrates an electric actuator according to a fifth embodiment of the present invention. As shown in FIG. 14, the electric actuator, generally designated by the reference numeral 106, differs from the electric actuator 82 according to the fourth embodiment in that a support 108 is employed in place of the slide table 96 of the electric actuator 82, and two rods 110a, 110b are employed as a guide means in place of the guide rail 102 and the guide member 104. Details of only those parts of the electric actuator 106 which differ from those of the electric actuator 82 according to the fourth embodiment will be described below.

As shown in FIG. 14, the electric actuator 106 comprises an elongate body 112 having a first hole 114 and a pair of laterally spaced second holes 116a, 116b which are defined longitudinally therein. The first hole 114, which is positioned between the second holes 116a, 116b, houses an electric motor 88, a rotor 90, a feed nut 92, a feed screw 94, and a tubular member 100 in the same manner as with the electric actuator 82 according to the fourth embodiment. A support 108 is fixed to an end of the feed screw 94 remote from the electric motor 88. Bushings 118a, 118b are mounted in respective end portions of the second holes 116a, 116b close to the support 108. The rods 110a, 110b are slidably inserted in the respective bushings 118a, 118b. The rods 110a, 110b and the second holes 116a, 116b jointly serve as a guide means for guiding the support 108 to move with respect to the body 112.

When the electric motor 88 is energized by a power supply (not shown), the feed screw 94 is linearly displaced in its axial direction. As a result, the support 108 moves in the longitudinal direction of the electric actuator 106 in response to the energization of the electric motor 88.

Since the feed screw 94 is surrounded by the tubular member 100, it is not exposed to the exterior, and hence is protected from the deposition thereon of dust, dirt, or other foreign matter. Furthermore, because the feed screw 94 axially moves within the hollow rotor 90 upon energization of the electric motor 88, the length of the electric actuator 108 may be relatively small.

Figure 15:
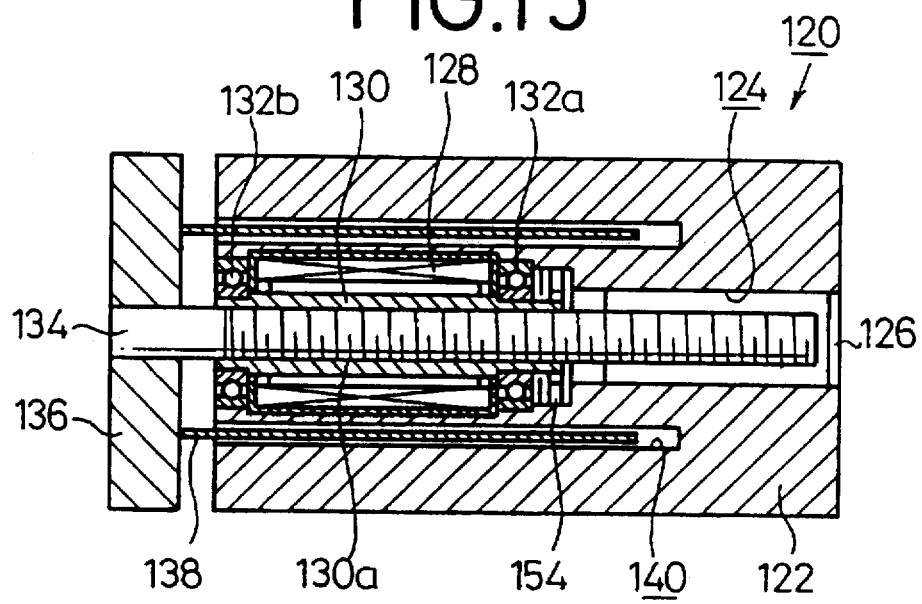
FIG. 15 is a longitudinal cross-sectional view of an electric actuator according to a sixth embodiment of the present invention.
Figure 16:
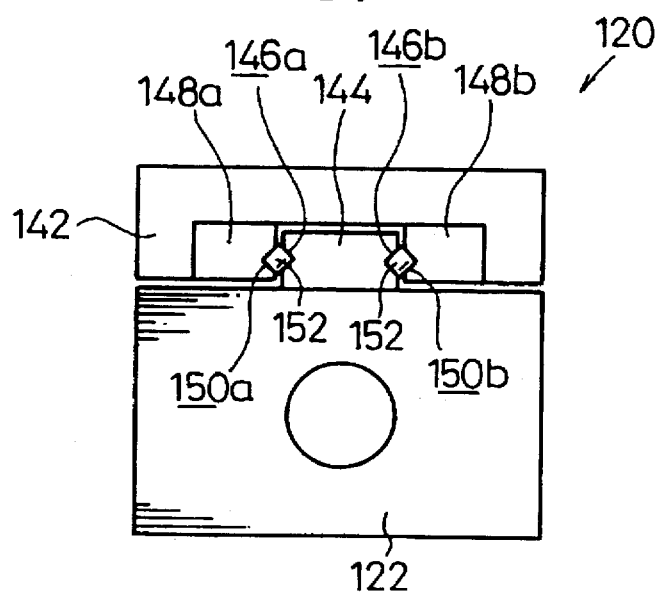
FIG. 16 is a side elevational view, as viewed from the right, of the electric actuator shown in FIG. 15.

FIGS. 15 and 16 show an electric actuator according to a sixth embodiment of the present invention. As shown in FIG. 15, the electric actuator, generally designated by the reference numeral 120, comprises an elongate body 122 having a hole 124 defined longitudinally therein which has an open end closed by a cover 126. An electric motor 128 is disposed in the body 122 coaxially with the hole 124. The electric motor 128 has a hollow cylindrical rotor 130 with an internally threaded inner wall surface 130a. The rotor 130 is rotatably supported by bearings 132a, 132b in the electric motor 128. A feed screw 134 extends axially in the hole 124 and is held in threaded engagement with the internally threaded inner wall surface 130a of the rotor 130. The feed screw 134 has an end to which a support 136 is fixed remotely from the cover 126. A tubular member 138 having an inside diameter greater than the outside diameter of the electric motor 128 is fixed at an end thereof to the support 136 coaxially with the feed screw 134, and slidably inserted in an annular hole 140 that is defined in the body 122 around the electric motor 128. Therefore, the tubular member 138 surrounds the feed screw 134.

A slide table 142 is coupled to the support 136. Alternatively, the slide table 142 may be integral with the support 136. As shown in FIG. 16, a guide rail 144 is mounted on an upper surface of the body 122 and extends in the longitudinal direction of the body 122. The guide rail 144 has a pair of V-shaped grooves 146a, 146b defined in outer side surfaces thereof. Two guide members 148a, 148b that are laterally spaced from each other are fixed to a lower surface of the slide table 142. The guide members 148a, 148b, which extend in the longitudinal direction of the body 122, have respective V-shaped grooves 150a, 150b defined in respective inner side surfaces thereof. A plurality of cylindrical roller bearings 152 are rotatably fitted in spaces of square cross-section which are defined by the V-shaped grooves 146a, 146b and the V-shaped grooves 150a, 150b. The guide members 148a, 148b, the guide rail 144, and the roller bearings 152 jointly serve as a guide means for guiding the slide table 142 to move with respect to the body 122. An encoder 154 is mounted on an end of the electric motor 128.

Operation of the electric actuator 120 is as follows: When the electric motor 128 is energized by a power supply (not shown), the rotor 130 is rotated about is own axis. The threaded engagement between the feed screw 134 and the internally threaded inner wall surface 130a of the rotor 130 converts the rotation of the rotor 130 into linear motion, thereby linearly displacing the feed screw 134 in its axial direction. As a result, the slide table 142 moves along the guide rail 144 in response to the energization of the electric motor 128, for thereby feeding a workpiece supported on the slide table 142. At this time, the feed screw 134 moves out of the hole 124, but remains surrounded by the tubular member 138 because the tubular member 138 also moves out of the hole 124.

The encoder 154 generates a pulse signal depending on the angular displacement of the electric motor 128, and transmits the generated pulse signal to a control system (not shown), which can detect the position of the slide table 142 with respect to the body 122 based on the pulse signal.

In the sixth embodiment, since the feed screw 134 is surrounded by the tubular member 138, it is not exposed to the exterior, and hence is protected from the deposition thereon of dust, dirt, or other foreign matter. Furthermore, the feed screw 134 is held in threaded engagement with the internally threaded inner wall surface 130a of the rotor 130, and movable within the rotor 130 upon energization of the electric motor 128. Consequently, the length of the electric actuator 120 may be relatively small while the slide table 142 may be movable in a relatively large range. As the electric actuator 120 requires no feed nut, it may be made up of a reduced number of parts and can be manufactured at a reduced cost.

Figure 17:
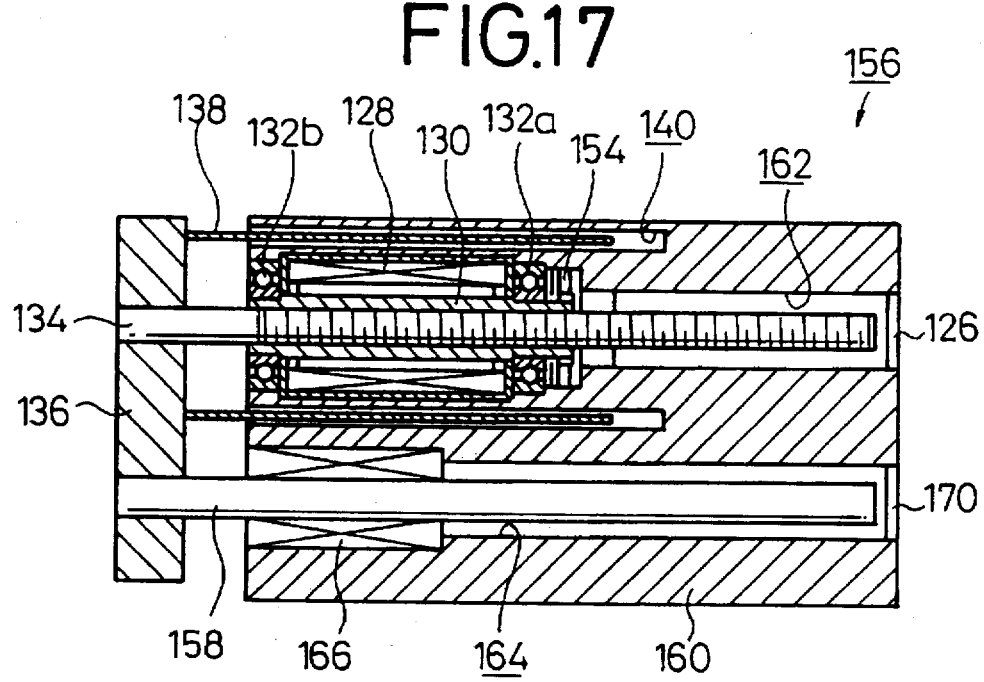
FIG. 17 is a longitudinal cross-sectional view of an electric actuator according to a seventh embodiment of the present invention.

FIG. 17 shows an electric actuator according to a seventh embodiment of the present invention. As shown in FIG. 17, the electric actuator, generally designated by the reference numeral 156, differs from the electric actuator 120 according to the sixth embodiment in that it has no slide table, and employs a rod 158 as a guide means in place of the guide rail 144 and the guide members 148a, 148b. Details of only those parts of the electric actuator 156 which differ from those of the electric actuator 120 according to the sixth embodiment will be described below.

The electric actuator 156 has an elongate body 160 which has a first hole 162 and a second hole 164 which are defined longitudinally therein and laterally spaced from each other. The first hole 162 houses an electric motor 128, a rotor 130, a feed screw 134, a support 136, and a cover 126 in the same manner as with the electric actuator 120 according to the sixth embodiment. A bushing 166 is mounted in an end portion of the second hole 164, and the rod 158 is slidably inserted in the bushing 166. The support 136 is mounted on ends of the feed screw 134 and the rod 158. The rod 158 and the second hole 164 jointly serve as a guide means for guiding the support 136 to move with respect to the body 160. An open end of the second hole 164 remote from the support 136 is closed by a cover 170.

When the electric motor 128 is energized by a power supply (not shown), the feed screw 134 is linearly displaced. Therefore, the support 136 moves in the longitudinal direction of the electric actuator 156 in response to the energization of the electric motor 128. At this time, the feed screw 134 moves out of the first hole 162, but the tubular member 138 also moves out of the first hole 162 in surrounding relationship to the feed screw 134.

Figure 18:
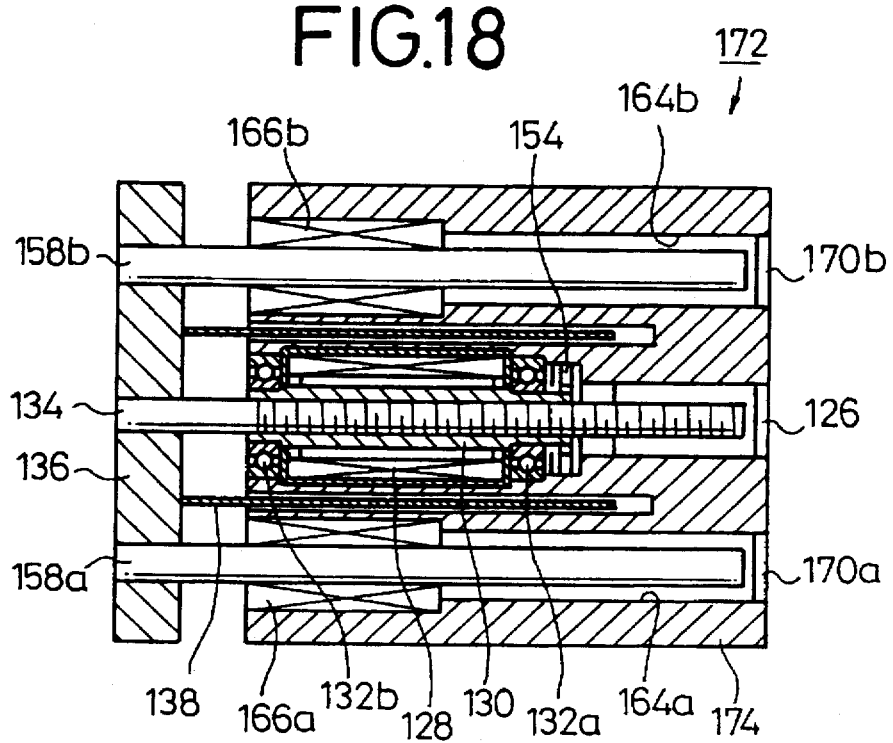
FIG. 18 is a longitudinal cross-sectional view of a modification of the electric actuator according to the seventh embodiment of the present invention.

FIG. 18 shows a modification of the electric actuator 156 shown in FIG. 17. As shown in FIG. 18, the modified electric actuator, generally designated by the reference numeral 172, has two rods 158a, 158b inserted respectively in two second holes 164a, 164b defined in a body 174 and slidably supported by respective bushings 166a, 166b inserted in respective end portions of the second holes 164a, 164b. The two rods 158a, 158b, which are connected at ends thereof to the support 136, are effective in guiding the support 136 more stably for more stable and accurate linear movement with respect to the body 174 than the single rod 158 shown in FIG. 17.

In the seventh embodiment, since the feed screw 134 is surrounded by the tubular member 138, it is not exposed to the exterior, and hence is protected from the deposition thereon of dust, dirt, or other foreign matter. Furthermore, because the feed screw 134 is movable within the rotor 130 upon energization of the electric motor 128, the length of the electric actuators 156, 172 may be relatively small while the support 136 may be movable in a relatively large range. The electric actuators 156, 172 may be made up of a reduced number of parts and can be manufactured at a reduced cost.

Although certain preferred embodiments of the present invention have been shown and described in detail, it should be understood that various changes and modifications may be made therein without departing from the scope of the appended claims.

What is claimed is:

1. An electric actuator for displacing a support with linear motion converted from rotation of an electric motor by a drive force transmitting shaft comprising:

a body having a hole defined therein;

a drive force transmitting shaft disposed in said hole;

a tubular member having a portion movable into and out of said hole, and surrounding said drive force transmitting shaft;

said tubular member having an end fixed to said support; and guide means mounted on said body and disposed laterally alongside said drive force transmitting shaft, said guide means extending parallel to said drive force transmitting shaft, for holding said support against rotation upon energization of said electric motor, wherein said guide means comprises at least one guide rail mounted on said body laterally alongside and parallel to said feed screw, and further comprising a slide table mounted for movement along said guide rail with respect to said body, one end of said slide table being coupled to said support.

2. An electric actuator according to claim 1, wherein said drive force transmitting shaft comprises a feed screw, further comprising a feed nut threaded over said feed screw and fixed to said tubular member.

3. An electric actuator according to claim 2, wherein said slide table is integral with said support.

4. An electric actuator for displacing a support with linear motion converted from rotation of an electric motor by a drive force transmitting shaft comprising:

a body having a hole defined therein;

a drive force transmitting shaft disposed in said hole; and a tubular member having a portion movable into and out of said hole, and surrounding said drive force transmitting shaft;

said tubular member having an end fixed to said support, wherein said drive force transmitting shaft comprises a feed screw with a feed nut threaded thereover, said electric motor having a hollow rotor, said feed nut being coaxially fixed to said hollow rotor.

5. An electric actuator according to claim 4, further comprising guide means mounted on said body parallel to said feed screw, for holding said support against rotation upon energization of said electric motor.

6. An electric actuator according to claim 4, further comprising a slide table coupled to said support.

7. An electric actuator according to claim 6, wherein said slide table is integral with said support.

8. An electric actuator for displacing a support with linear motion converted from rotation of an electric motor by a drive force transmitting shaft comprising;

a body having a hole defined therein;

a drive force transmitting shaft disposed in said hole; and a tubular member having a portion into and out of said hole, and surrounding said drive force transmitting shaft;

said tubular member having an end fixed to said support, wherein said electric motor has a cylindrical rotor having an internally threaded inner wall surface, said drive force transmitting shaft comprising a feed screw fixed to said support and held in threaded engagement with said internally threaded inner wall surface.

9. An electric actuator according to claim 8, further comprising guide means mounted on said body parallel to said feed screw, for holding said support against rotation upon energization of said electric motor.

10. An electric actuator according to claim 8, further comprising a slide table coupled to said support.

11. An electric actuator according to claim 10, wherein said slide table is integral with said support.

12. An electric actuator for displacing a support with linear motion converted from rotation of an electric motor by a drive force transmitting shaft comprising:

a body having a hole defined therein;

a drive force transmitting shaft disposed in said hole;

a tubular member having a portion movable into and out of said hole, and surrounding said drive force transmitting shaft;

said tubular member having an end fixed to said support; and guide means mounted on said body and disposed laterally alongside said drive force transmitting shaft, said guide means extending parallel to said drive force transmitting shaft, for holding said support against rotation upon energization of said electric motor, wherein said guide means comprises at least one further hole defined in said body laterally alongside and parallel to said feed screw, and further comprising a rod slidably disposed in said further hole, one end of said rod being coupled to said support.

* * * * *